June 9, 1942.  W. S. REYNOLDS  2,286,159
ARTICLE SEALING AND LABELING MACHINE
Filed Aug. 19, 1939  6 Sheets-Sheet 6
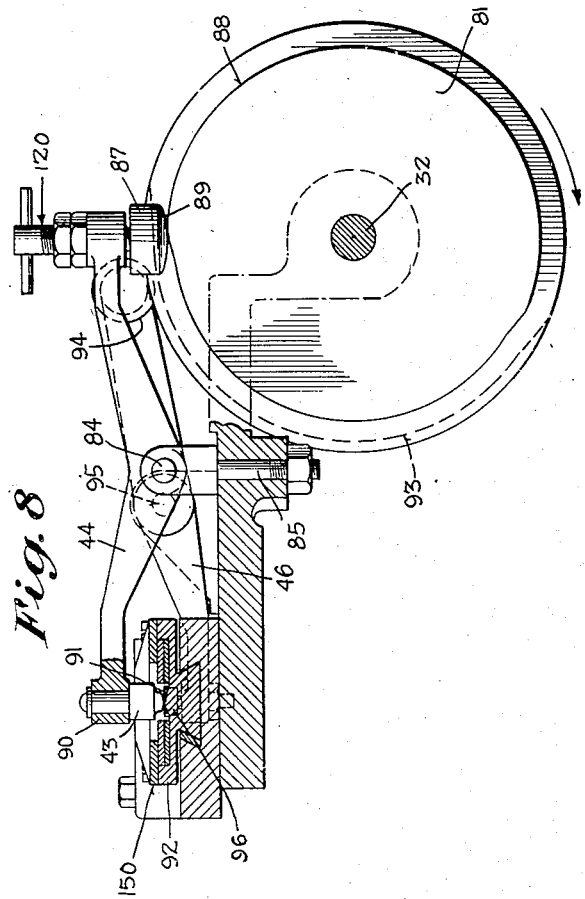
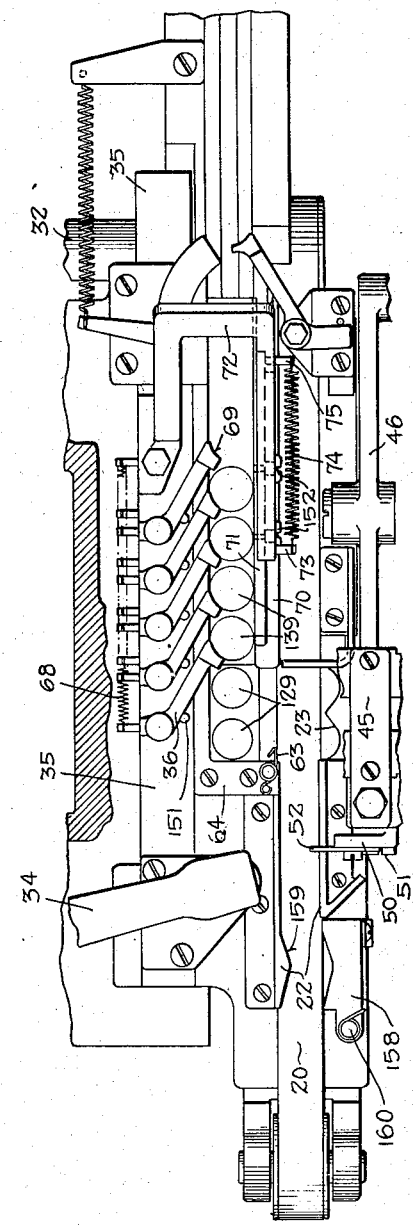
INVENTOR
Warren S. Reynolds
BY
ATTORNEYS Patented June 9, 1942

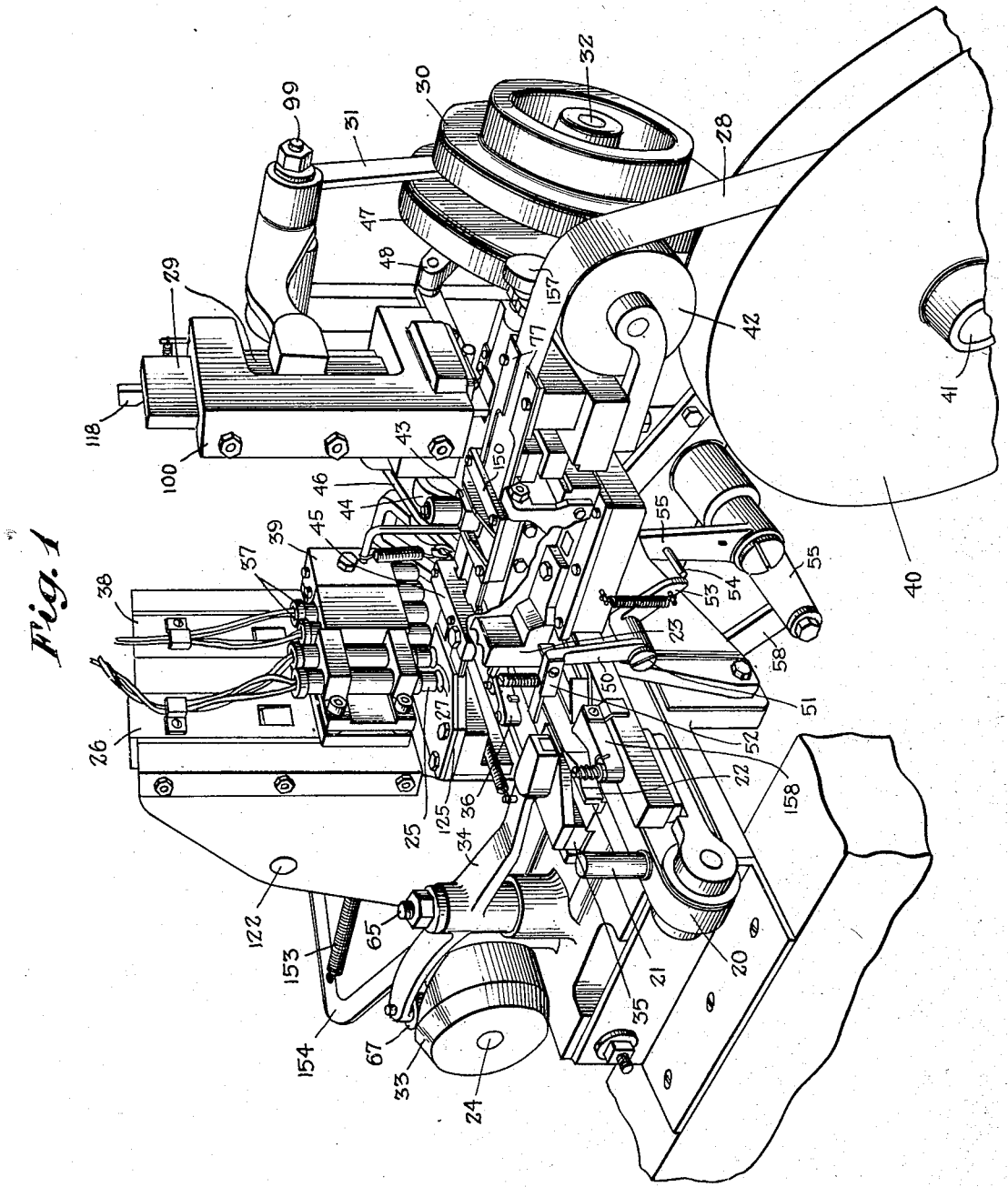

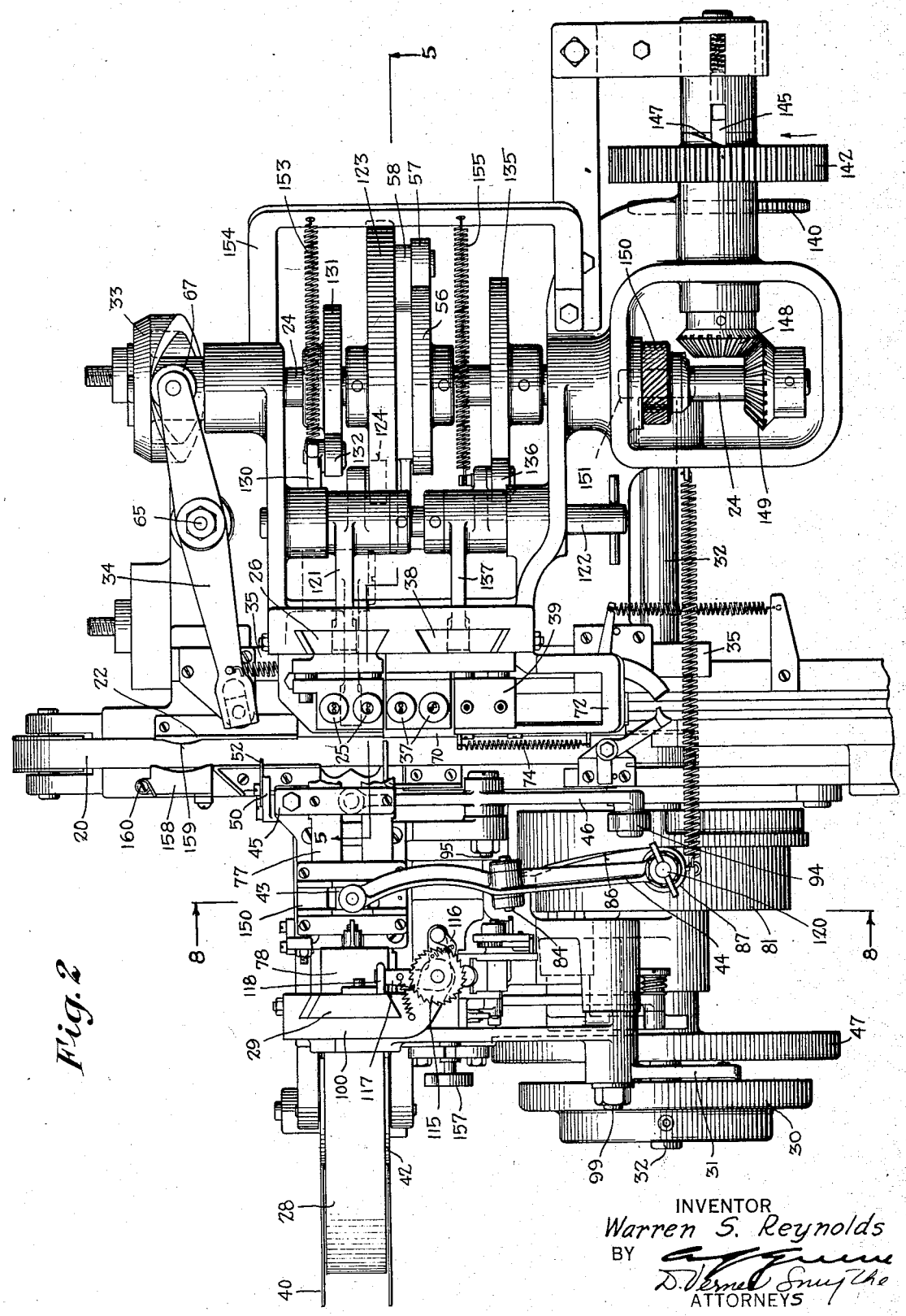

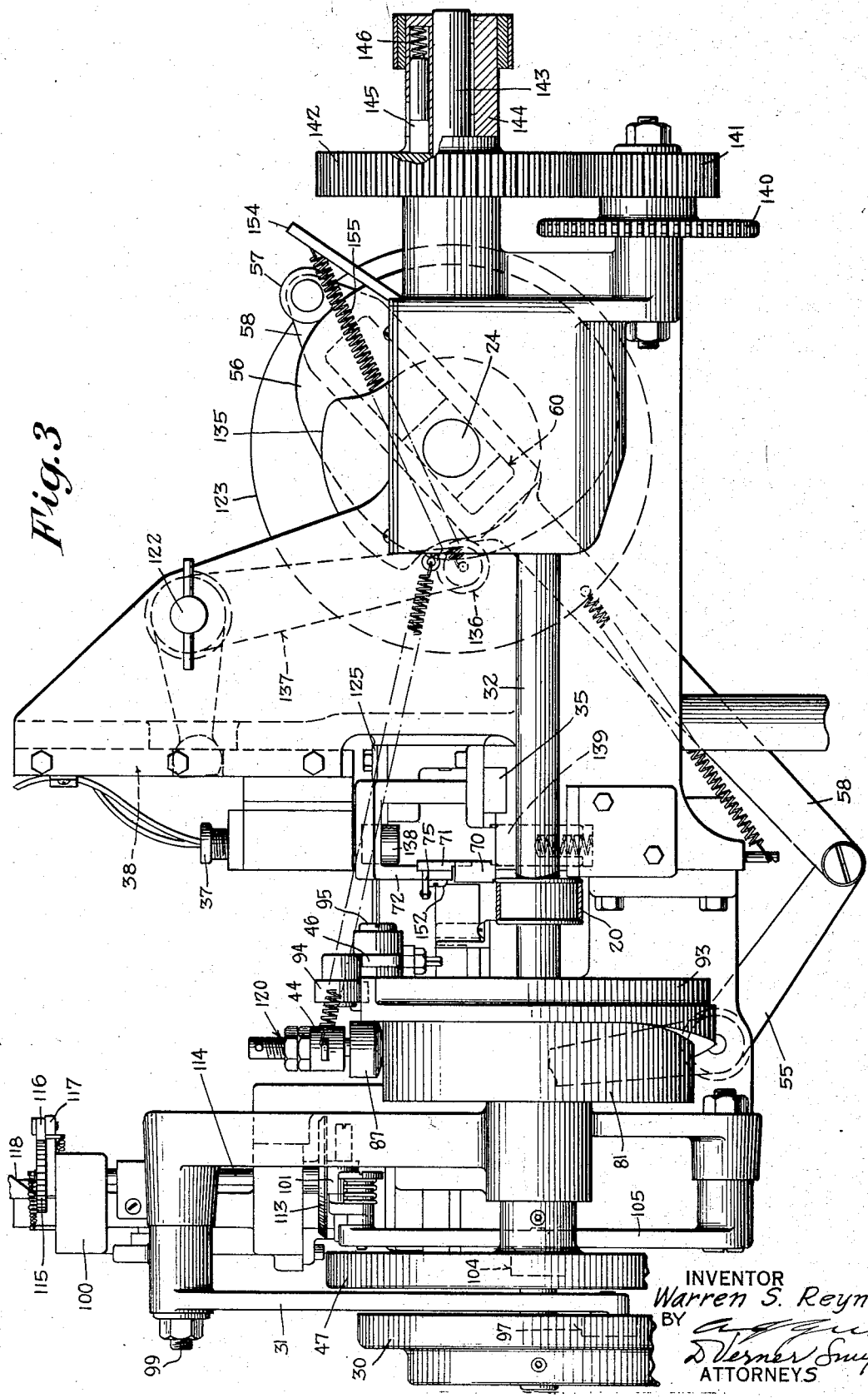

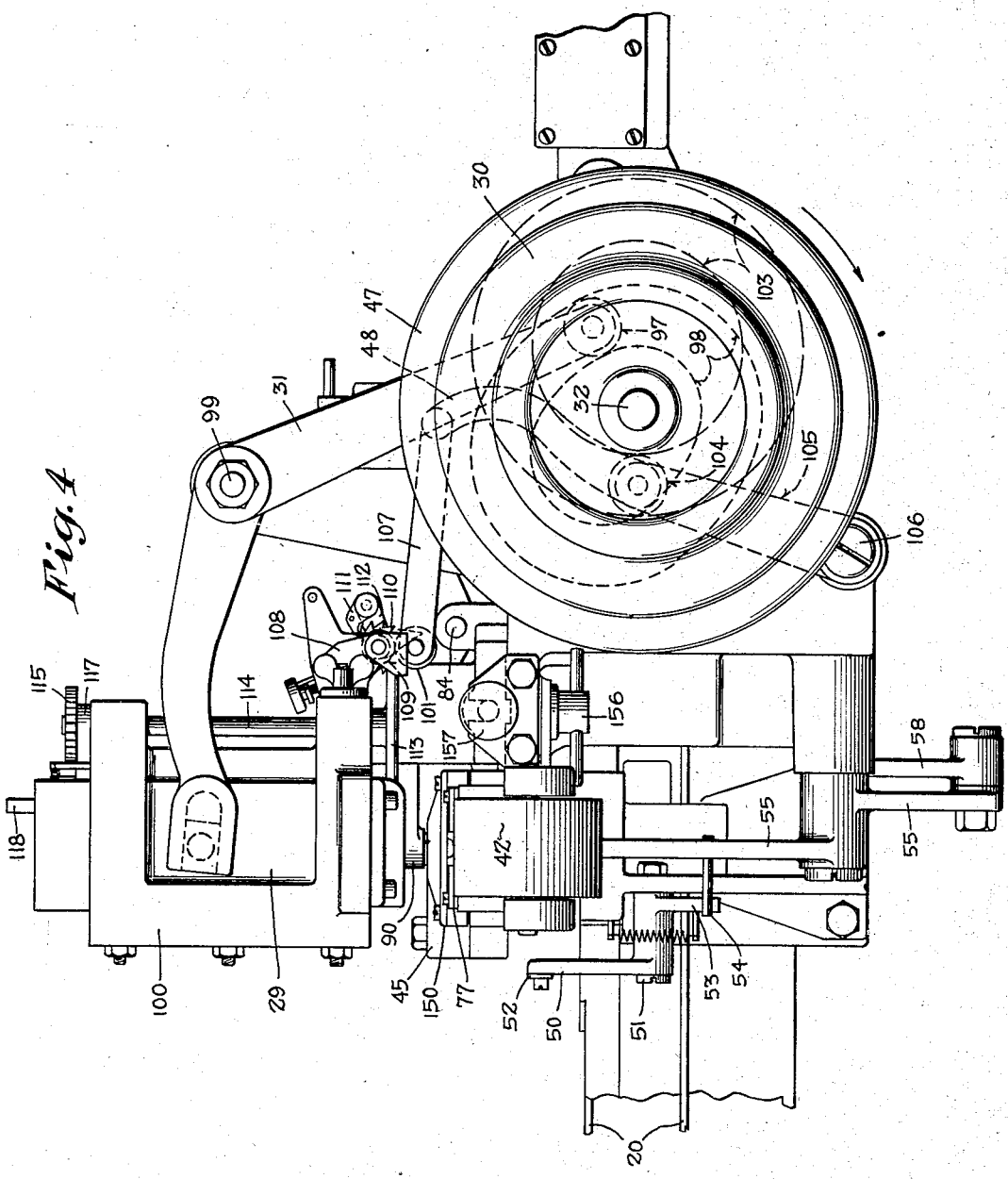

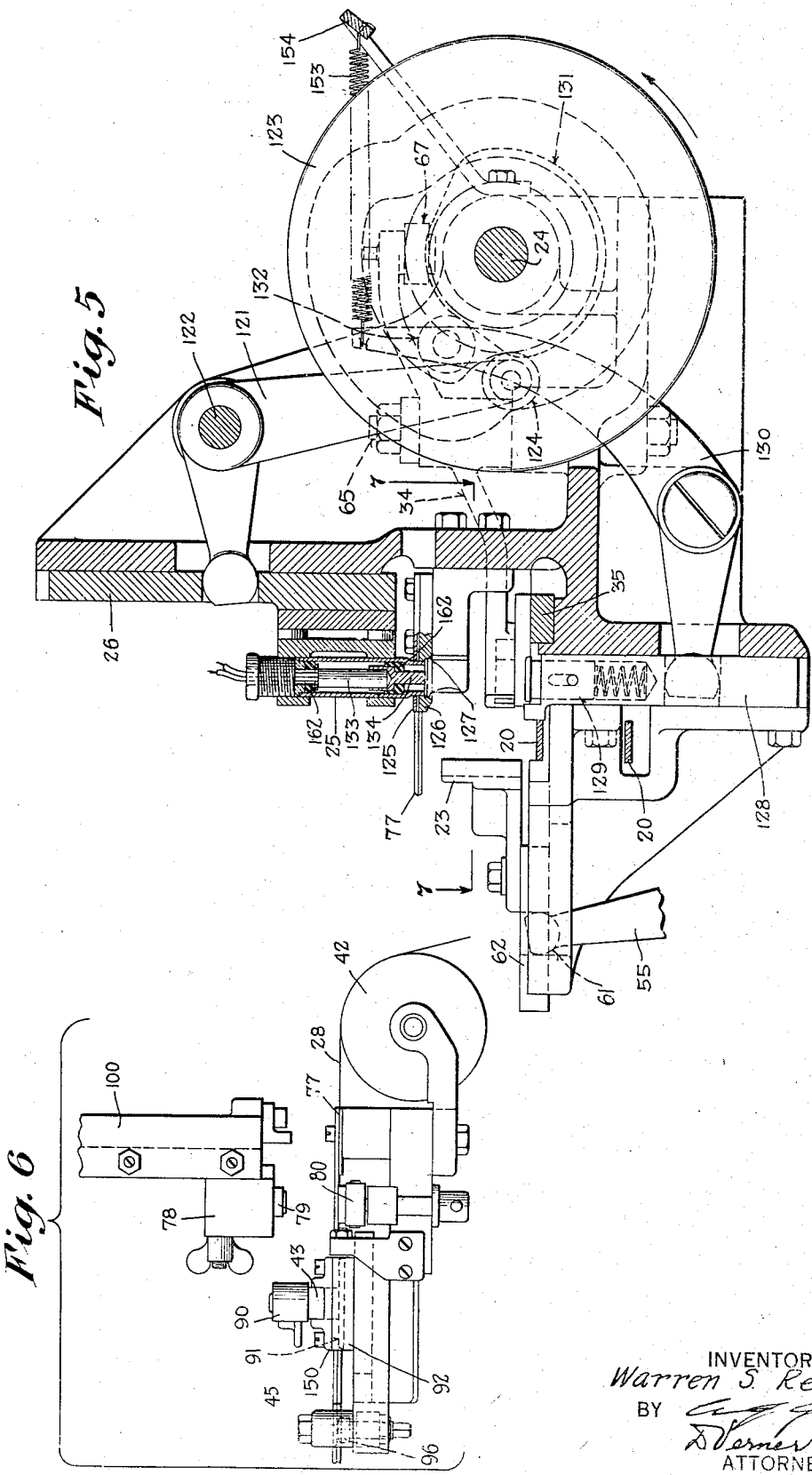

2,286,159

UNITED STATES PATENT OFFICE 2,286,159

ARTICLE SEALING AND LABELING MACHINE

Warren S. Reynolds, Stratford, Conn., assignor to Remington Arms Company, Inc., a corporation of Delaware Application August 19, 1939, Serial No. 291,106

20 Claims. (Cl. 216—24)

This invention relates to a method and machine for placing seals with a thermoplastic adhesive on articles. It is particularly adapted to the placement of such seals on the end closures of shot shells, said end closures being integral and adjacent the end of the body of the shot shell such as disclosed in the patent to Meadows (No. 929,866), and the patent to Finlay and Stauffer, No. 2,242,907, issued May 20, 1941. The invention also discloses a method and the apparatus for placing printing on the seal before the seal or label is severed from a strip of the seal or label material. It is to be distinctly understood, however, that the use of the invention to place the seals or labels on shot shells is merely illustrative and that the invention is not limited thereto, but is capable of general application. The objects of the invention will appear from the following specification and drawings.

In the drawings:

Fig. 1 is a perspective view looking from the left-hand rear corner of the machine with some of the parts in section showing delivery of the articles to the machine.

Fig. 2 is a plan view of the machine.

Fig. 3 is a front view of the machine facing the point of delivery of the articles from the machine.

Fig. 4 is a left-hand view of a portion of the machine.

Fig. 5 is a fragmentary sectional view at line 5—5 of Fig. 2.

Fig. 6 is a fragmentary view looking from the rear of the machine showing the details of the printing and paper-feeding mechanism.

Fig. 7 is a detail plan view at line 7—7 of Fig. 5 showing the feeding mechanism for the articles through the machine.

Fig. 8 is a left-hand sectional view of a portion of the machine taken at line 8—8 of Fig. 2 showing the details of the paper feeding means.

A general description of the operation of the machine will first be given which will be followed by a detailed description of the operation and construction of the various component parts.

The description will be given for the placing of a printed label and end-closure means on the end of a shot shell. It is to be distinctly understood that wherever the term "shot shell" or "shell" is used that such means any article upon which a seal or label is to be placed and is not limited to a shot shell or shell.

The sealing disc may be of any desired shape and may or may not have printed matter thereon. It may serve merely as a label or may serve as a sealing means, or it can perform both functions.

Referring to Fig. 1, the articles which are to have a label or seal placed thereon are delivered in any suitable manner or by hand to the moving belt 20. The belt carries the shell 21 between the guides 22 until they are in front of the transverse transfer finger 23, in this particular instance two shells being transferred simultaneously, although it is evident that one or any number may be transferred and operated on, depending upon the design of the machine. The main operating shaft 24 has suitable cams and levers thereon to move the transfer means, blanking punches, sealing punches, and also carries at its opposite end the driving gears for the paper feeding and printing mechanism, which will be described in detail later. The shells are transferred to the left until they are in position under the blanking punches 25 carried by the reciprocating head 26. The blanking punches cooperate with the dies 27 to punch a circular or suitable shaped disc from a strip of paper 28 fed thereto, said paper having an adhesive of a thermoplastic type on the other side and having had, if desired, printed matter previously placed thereon. This is done by a stamp located on the reciprocating printer slide 29, which is operated by the printer cam 30 through lever 31, said cam being driven from the printing and feeding shaft 32. There are small electric heaters located within the punches 25 for the purpose of causing the discs, after they have been punched, to adhere to the shells upon which the discs are impressed, the heater being of small area and of such a size as to preliminarily attach the disc thereto to prevent displacement as the shells are moved further to the front of the machine by the shell transfer means. Upon completion of this operation, the shell transfer cam 33, through shell transfer lever 34, moves the shell transfer bar 35 to the front of the machine (to the right, Fig. 1). The longitudinal shell transfer fingers 36 engage the shells and move them with the transfer bar to a position under the sealing heater means 37 carried on a reciprocating sealing head means 38 operated by a suitable cam located on shaft 24. The next operation of the machine causes the heater to engage the top of the seals for a sufficient length of time to make the entire thermoplastic on the disc adhesive and cause adhesion of the disc to the shell. Further operation of the machine causes an upward reciprocation of the heater 37; a movement of the transfer bar 35 then causes further displacement of the shells to the front so that they will be underneath the pressure head 39, which then reciprocates downwardly, holding the labels in place on top of the shells for a sufficient length of time to insure proper adhesion of the seal thereto. The longitudinal transverse transfer fingers 36 are pivoted to the transfer bar 35 and are yieldable as the transfer bar moves to the left in its return operation so that as more shells are moved into engagement therewith by the transverse transfer finger 23 the operation will be continuous. Shells under the blanking punches 25 will have the disc placed thereon, shells under the sealing heater means 37 will have the thermoplastic heated completely, and the shells under pressure means 39 will have the labels thereon held firmly in place to assist the adhesion and to give the thermoplastic time to cool sufficiently to insure proper affixing thereto. After being moved further to the right upon completion of the action of the pressure head 39, the shells will be delivered to a point at the front of the machine where they may be removed by any suitable means. The seals or labels are stamped from the paper 28 which, as has been stated, has a thermoplastic adhesive on the lower side thereof, said paper being supplied, for example, from a roll 40 located on a suitable shaft 41. The paper is fed into the machine over the guide roller 42 and under the printer slide 29. A paper feeder is located at 43 and operated from a cam located on shaft 32, the paper feeder reciprocating in the direction of movement of the paper strip 28. The paper feeder block 43 is arranged for relative motion to the upper half of the frame 150, so that as pressure is exerted downwardly by the paper feeder lever 44 the paper will be clamped between the block 43 and the lower part of the paper feeder frame 150. Then as the lever 44 is moved to the left the paper will be carried therewith. The upper half of the paper binder is located at 45, the lower half thereof being operated by the paper binder lever 46 which is in turn operated by a cam located on shaft 32. The lever 46 oscillates in a vertical direction so that, as the end under the binder 45 moves upwardly, the paper will be clamped between the end of lever 46 and the upper half of binder frame 45. As the paper feeder means 43 moves to the left or towards the work, the relation of the parts of the paper binder 45 are such as to allow free passage of the paper strip 28 therethrough, but as the paper feeder 43 moves to the right free from the paper, the parts thereof having been separated by its cam, the lever 46 is moved upwardly so as to bind the paper at point 45 and prevent movement of the paper backwardly. During the period that the paper is stationary in the feeding operation, the printer slide 29 has been moved downwardly and an impression made of the desired printed matter on the paper, the relation of the parts being such that the printed matter will have proper location within the blanking dies 27 for placement on the shells. In order to provide for adjustment, the printer head may be slidably mounted on the frame, being held in place by the clamping screw 156 (Fig. 4), a screw adjusting means 157 being provided to move the printer head so that the printing centers under the punches. During the interval in which the printer is in its upward position, the inking cam 47 operates the inking lever 48, causing it to reciprocate to the left and deposit ink upon the printing surface.

*Article or shell feeding means*

The articles or shot shells to be operated upon are fed by a loading machine or in any suitable manner to the endless belt 20, and as they are carried towards the front or delivery point of the machine, guides 22 (Figs. 2 and 7) guide the shells. One of the guides may have a swinging gate 158 and have an arcuate indentation along its surface corresponding to a projection 159 in one of the guides 22. In the event that the shells are stopped and the loading machine continues supplying shells to the belt, the shells will be directed by the projection 159 toward the swinging gate 158 which will then pivot about the gate pivot 160 allowing the excess shells to escape from the machine. This will also give notice to the operator that there has been a stoppage. A pivoted arm 50, pivoted at 51 to the frame of the machine (Figs. 1, 2 and 4), is provided to stop the movement of the articles inwardly as the transverse transfer lever 23 is operated until said lever is in its proper position for the reception of the articles, an extension 52 contacting the articles. The lower arm 53 of the stop lever is operated by pin 54 located on the transverse shell transfer lever 55. As the pin 54 moves to the left with the lever 55, arm 50 is rotated clockwise (Fig. 1) allowing the proper number of shells to be carried past the same. The lever 55 is operated by the shell feed cam 56 (Fig. 2) through the cam roller 57 (Figs. 2 and 3), connecting link 58, and the pivoted connection 59 with lever 55. The connecting link 58 may be slotted as at 60 so as to straddle the main operating shaft 24. As the lever 55 moves counter-clockwise (Fig. 1) the upper end 61 (Fig. 5) engages the carrier 62 of the transverse transfer finger 23, moving said finger and carrying the shells towards the punches and the transfer bar 35. As the finger is moved, the stop means 50 is removed from the path of the articles on the belt, allowing said articles to be moved with the belt until they engage the side surface of the fingers 23. A spring 63 is provided to assist in the guiding of the shells. This is necessary because the shells are heavy at their upper end, and the spring helps to maintain them in an upright position as they are moved by the fingers. The sliding guide 71 is also carried in front of the shells and serves as a guide and shutter as the fingers 23 move the shells toward the punches, the sliding guide 71 moving out of the way of the advancing shells. In the particular disclosure shown, two shells are transferred at each reciprocation of the transverse transfer finger. A fixed guide means 64 assists in the guidance of the shells. Transfer bar lever 34 is pivoted at 65 and is operated by the shell transfer cam 33 driven by the main shaft 24 through the cam roller 67. Upon the completion of the operation of the blanking punches, which will be described at a later point, the transfer bar 35 is reciprocated toward the front of the machine, which moves the shells which have just been operated upon in a forward direction to a position under the next set of plungers, which in this instance are heaters mounted on a reciprocating plunger. After the shells are moved and during return movement of the transfer bar 35, the longitudinal transverse fingers 36, which are yielding, held by springs 68, will allow the passage past the shells of the fingers which will then move back into place against the stops 151 so that the arcuate surface 69 of each engages a shell in readiness for the next forward movement of the transfer bars. Upon the completion of the operation and another reciprocation of the transfer bar 35, the arcuate surfaces 69 engaging the shells will push them in a forward direction until the shells are ejected or delivered from the machine after having operations thereon completed.

To assist in the guiding of the shells and to cause them to remain in the proper location as the reciprocating transfer bar is operated, a fixed guide 70 (Figs. 2 and 3) is provided having mounted thereon a sliding guide 71 (Fig. 7) moving with the reciprocating transfer bar 35, said movement being imparted thereto by the arm 72 mounted on the transfer bar 35 and having on its opposite side a pin 73 to which a spring 74 is attached, the other end of the spring being fastened to a pin 75 mounted on the sliding guide 71. The action of this spring is such as to allow the slide to move relative to the transfer bar in its return movement, thereby preventing damage in case of failure of the shells to feed properly. The sliding guide 71 has screws 152 fitting in a slot located in the arm 72 to allow the relative movement in the return directly and to move the slide forwardly as the transfer bar moves forwardly.

Paper feeding

In the machine shown, the sealing paper having a layer of thermoplastic adhesive on a surface thereof may be fed to the machine from roll 40 over a guide roller 42. It is to be understood, however, that other forms of feeding the labeling paper may be used without affecting the operation of the machine. The paper enters between the guides 77 (Figs. 4 and 6). A printer block carrier 78 carries printing block 79, on which may be placed the desired printed matter or design, the reciprocation of the carrier 78 leaving an imprint of the printing block 79 on a strip of paper underneath it at that point, there being a bed 80 directly underneath the printing block. It has been found that a rubber printing block is better than a metal one. The paper is moved forward by means of the paper feeder 43 and the paper binder 45, which will now be described.

The paper feed and binder cam 81 has cam surfaces thereon for operating both the paper feeder lever 44 and the paper binder lever 46. The paper feed lever 44 is pivoted at 84 for movement in a vertical plane and at 85 for movement in a horizontal plane, the centers of said pivots intersecting. The paper feed and binder cam 81 is driven by printing and feeding shaft 32 and, as the cam rotates, the surface 86 acts upon roller 87, moving paper feeder lever 44 in a horizontal plane, thereby causing paper feeder 43 to reciprocate along the line of the paper feed movement. The surface 88 of cam 81 also is a cam surface (Fig. 8) acting on the under side 89 of roller 87, which in turn causes paper feed lever 44 to reciprocate about its horizontal pivot axis 84, thereby causing the end 90 of the lever 44 acting on paper feeder block 43 to bear against button 91 located in the lower half 92 of paper feeder frame 150 (Figs. 6 and 8). The binding action occurs as the paper feeder is reciprocated towards the blanking punches or work. In the reverse direction, the paper is not clamped therebetween so that the paper feeder can move freely until the end of its stroke is reached, at which time the paper is bound again and moved toward the blanking punch. To prevent rearward motion of the paper and to allow only forward motion of the paper, the cam surface 93 of cam 81 acts on roller 94 of paper binder lever 46, causing the paper binding lever to rotate about its horizontal axis 95. Paper binder 45 is stationary and the button 96 on the end of lever 46 binds the paper between button 96 and stationary portion 45 as the paper binder lever 46 is oscillated, this binding action taking place as the paper feeder block 43 is reciprocated in its rearward direction, the paper being carried forward as the paper feeder moves toward the paper binder, moving the paper inwardly. As stated before, the location and spacing of the printing mechanism is such that the desired printing matter will come directly underneath the punching dies, and the feeding action is such as to index the paper properly to obtain this position. At 120 there is an adjusting means for the movement of the paper feeder lever 44 in the vertical direction.

Printing

The reciprocating printer slide 29 carrying the printing block 79 is operated by the printing lever 31 actuated by the printer cam 30 through cam roll 97, the cam surface of said cam being in the form of an internal race 98 in cam wheel 30, the printer slide lever being pivoted at 99. The printer slide is suitably mounted in the printer slide guide 100 in any suitable manner. The inking roll 101 is reciprocated over the printing block by means of the inkroll cam 47, having an internal cam race 103 acting on cam roller 104 mounted on the inkroll lever 48 which is pivoted at 106, the roll being connected to said lever 48 by means of inkroll link 107. As the inkroll cam is rotated, the arm 105 is oscillated causing the ink roll 101 to move in a horizontal direction and over the printing block to ink the same. Ink is distributed to the roller 101 from the fount 108. The fount may be of any conventional design, feeding ink onto the roll 109, said roll 109 being rotated by the ratchet and pawl 110 and 111, there being a means mounted on link 107 to engage a ratchet arm 112 to reciprocate the roll 109, thereby presenting a fresh supply of ink from the fount to the distributing ink roll 101 each operation thereof. An ink distributing disc 113 is provided across which the ink distributing roll 101 passes. A shaft 114 is connected integrally with the disc 113 and is rotated by the ratchet wheel 115, operated by the pawl 116 mounted on the arm 117 which is engaged by a cam 118 of the printer slide. Each reciprocation of the reciprocating slide therefore causes the ink distributing disc 113 to be rotated, serving to more completely distribute the ink on the inking roll 101.

Blanking

As the paper strip is moved inwardly and comes over the shells upon which the seal is to be placed, means are provided for cutting the seal to the desired configuration, which will now be described.

A reciprocating blanking head 26 carries punches 25, said head being reciprocated vertically by means of the blanking lever 121 pivoted at 122 and actuated by the shell blanking cam 123 through the cam roll 124, the blanking cam 123 being driven from the main shaft 24. The punch 25 cooperates with a die 125, the paper passing between 125 and a lower portion 126 of the die, so that as the punch 25 moves downwardly, a disc of the desired configuration will be punched from the sheet. The lower portion of the opening in 126 is enlarged as at 127 to receive the top surface of the article on which the seal is to be placed, in this instance circular to receive the top of the shot shell, the shell having been moved under the punch by transverse transfer finger 23 until it is over the shell raising plunger 128 which has inside thereof a spring pressed plunger 129 engaging the bottom of the shell. A shell raising lever 130, operated by the shell raising cam 131 through the roller 132, raises the shell raising plunger 128 and with it the spring pressed plunger 129 until the article is securely held underneath the punch. In the event of a jam of the parts or sticking of the articles or because they are too long, the spring pressed plunger 129 will yield and thus provide a safety means and the proper pressure thereunder. The spring 153, attached to lever 130 and the frame 154, causes the cam roller 132 to follow the cam and provides a further yieldable safety means. In the interior of plunger 25 there is located a heater 133 having a point contact at 134 of restricted area. The heater point 134 may be of metal, the upper end thereof being in contact with a heating element 133. The heater point and element are spaced from the outside of the punch by means of asbestos or other suitable insulating material such as in the form of washers 162. It is necessary that this separation exist as otherwise the heat will so distort the punch as to prevent its proper cooperation with the die. As the plunger 25 moves downwardly, cutting the shell disc and causing it to impinge upon the article, the heater point 134 will cause a small area of the thermoplastic to become sufficiently hot so that the seal will be preliminarily attached to the shell and thus allow movement of the shell to another position without danger of the seal becoming removed. The shells are then moved by the transfer means as disclosed previously until the next position is reached under the sealing heaters 37 (Fig. 3) carried on the heater reciprocating sealing head 38. The heater 38 is operated by means of the shell sealing cam 135 acting through cam roll 136 and shell sealing lever 137, a spring 155 causing the roller to follow the cam. The lower end of the heater may have a skirt 138 to encircle the shell so as to keep it in position, the entire point of contact of the heaters of this station substantially coinciding with the sealing disc so as to cause the thermoplastic to become completely adhesive and adhere to the shell. The shell sealing cam carries the heaters 37 downwardly to impinge on the shells as soon as the articles come to rest underneath said heaters. The shells rest on spring pressed plungers 139 which allow for differences in length and provide safety means in case of a jamming or failure to feed properly. It can be seen that the time necessary for the blanking operations and carrying the sealing discs downwardly to the shells is such as to preclude the necessary time for heating of the adhesive at the first station, and also presents difficulties as stated because the plunger acts as a cutter and the heat would affect the clearance thereof with the die and spoil the operation as a cutter. Therefore the heater station is necessary and it is so arranged that the heaters stay upon the seals as long as possible or as is necessary. At the next reciprocation of the sealing heater head means 38 upwardly, the articles are moved another step to a position under the pressure heads 39, which reciprocate with the sealing heater head 38 and come down at the top of the articles which have just previously had the thermoplastic adhesive rendered adhesive, and insure that the contact and adhesion are complete.

Clutch

The machine is driven from a suitable motor connected to a sprocket or other wheel 140 (Fig. 3) which may drive the spur gear 141 meshing with gear 142, the gear 142 being loosely mounted on shaft 143. The sleeve 144 is keyed to shaft 143 and has mounted therein a reciprocable plunger 145, there being a spring 146 to urge said plunger into engagement with the notch 147 (Figs. 2) so that as gear wheel 142 is rotated in the direction of the arrow as shown, it will engage the plunger 145, causing shaft 143 to rotate therewith. Shaft 143 has a bevel gear 148 mounted thereon which meshes with a suitable gear 149 mounted on the main shaft 24, serving to drive the same. Also mounted on the shaft 24 is a spiral gear 150 meshing with a mating gear 151, the spiral gear 151 being carried by the paper feeder and printing shaft 32 (Fig. 2). If it is desired to operate the machine a fraction revolution, by hand, for example, by taking hold of the wheel 30, it is possible to so do because it can be seen that as the sleeve 144 is moved ahead, 142 remaining stationary, the spring pressed plunger 145 will be moved inwardly, allowing free rotation of the machine by hand and insuring that the clutch will take hold of the gear wheel 142 at the same place each time.

Summary of operation

The shells are delivered to the endless belt 20 and are carried inwardly until they are stopped by the extension 52 of the pivoted arm 50. As the transverse transfer finger 23 is moving inwardly, pin 54 rotates arm 50 about its pivot 51 allowing, in this instance, two shells to pass extension 52, the shells being stopped by the side of the transverse transfer finger 23. As the shell feed cam 56 operates the shell transfer connecting link 58, shell transfer lever 55 moves the transverse transfer finger 23 to the right (Fig. 1). The projection 52 again blocks the passage of the shells on the endless belt 20. As the finger 23 moves further to the right, the endless belt carries the shells forward until they are immediately in front of the engaging finger therefor of the transfer finger 23. Prior to the movement of the finger 23 in the reverse direction to carry the shells under the punches, the transfer bar 35 has moved rearwardly after having moved the shells that have just been operated upon forwardly, so that the new shells will be moved under the blanking punches, the transverse transfer finger 23 continuing its movement until the shells are located directly under the blanking punches 25, resting upon the shell raising plunger 129. Shell raising cam 131 operates shell raising lever 130, carrying plunger 128 and the spring pressed plunger 129 upwardly so that the shell is raised upwardly, fitting into the enlarged area 127 of the lower portion of the die 126. Shell blanking cam 123 now operates on the blanking lever 121, causing the reciprocating shell blanking head 26 to move downwardly. The paper 28, which has previously been fed through the guides, is sheared by the cutting edge of the plunger 25 as it passes through the die, further movement of the plunger carrying the paper against the top of the shell in the enlargement 127. The heater point 134, which has previously been brought to the proper temperature, contacts a small portion of the disc that has just been cut, heating the thermoplastic sufficiently to cause temporary or preliminary adhesion to the shell. The blanking cam 123 then raises the reciprocating blanking head 26 and at the same time the shell raising cam 131 lowers the shell raising plunger 128, causing the top of the shells to be removed from the enlarged aperture 127 so that they may be moved forwardly in the machine by the transfer bar 35.

The transfer bar 35 is now moved forwardly due to the action of shell transfer cam 33 on shell transfer lever 34, moving the shells to their next station underneath the sealing heaters 37, the fingers 36 engaging the shells, carrying them forward, and then, upon the return movement of the transfer bar 35, springs 68 allowing yielding of these fingers. The shells are guided also by the fixed guide 70 and the sliding guide 71.

Movement of the transfer bar 35 carries with it the arm 72 which has a slot therein through which the screws 152 project. This carries the sliding guide 71 forward at the same time that the transfer bar goes forward. In the return movement of the transfer bar, the friction between the sliding guide and arm 72 is such as to normally carry the same therewith. However, in case of a stoppage blocking the return of sliding guide 71, the spring 74 will allow the transfer bar and arm to move relative to the sliding guide 71, preventing damage to the parts or the shell being worked on. The shell sealing cam 135 operates the shell sealing lever 137, moving the reciprocating sealing head 38 downwardly, thereby carrying the heaters 37 over the shells that have just been moved thereunder, skirt 138 serving to further hold the shells. The heaters 37 cover substantially the entire area of the shells and such contact is maintained for a longer period of time than by the blanking plungers at the previous station. Spring pressed plungers 139 allow for the differences in lengths of the various shells, and press the shells firmly against the heaters. After the heaters 37 have been raised and the transfer bar 35 has moved the shells another step to the next station under the pressure heads 39, the shell sealing cam 135 in its next rotation again reciprocates the sealing head 38 downwardly bringing the pressure heads 39 to bear against the shells that have just previously had the thermoplastic placed in its adhesive condition. The pressure is applied long enough to insure the proper adhesion of the seal to the top of the shell. After the reciprocating head 38 has been again raised, the transfer bar in its next forward movement moves the shells toward the delivery point of the machine. It is to be understood that there is a continuous flow of shells through the machine so that under the blanking punch there will be two shells, under the heater means 37 there will be two shells, and under the pressure head there will be two shells being operated upon at the same time. During the period in which the blanking punches are raised, the paper is fed forward by the paper feeder lever 44 which at this point has been rotated so that the block 43 is pressing against the button 91 while the lever 44 oscillates carrying the paper therewith, the paper binder lever 46 at this time being out of contact with the paper and allowing free passage therethrough. Upon the completion of this operation, the paper feeder lever 44 is rotated about the horizontal axis 84, freeing the paper feeder from binding contact with the paper, and at this time the paper feeder lever is rotated about its vertical axis 35, returning the paper feeder frame 150 in readiness for its next paper feeding movement. During the return movement, the paper is held at the paper binder 45. Also during this interval, the blanking punches are reciprocated downwardly, cutting the discs as described heretofore. During this stationary period of the paper, the printing operation by the printing mechanism takes place, the inking means having previously been operated to properly ink the printing block 79.

The proper timing of these operations with those of the reciprocating blanking punch, sealing heaters and pressure heads is obtained through the inter-relation of shafts 32 and 24 and the proper design of the cams mounted thereon. The heaters may be of any of the usual types of heaters and do not necessarily have to be electric, although these lend themselves readily to the construction as shown.

The invention is not to be considered as limited to the specific construction shown and described by way of illustration, since it extends to all equivalent constructions and articles to be worked on falling within the scope of the appended claims, which claims are to be broadly construed.

What is claimed is:

1. In the application of seals with a thermoplastic adhesive to an article, the method comprising the steps of preliminarily attaching the seal to the article by heating a portion thereof, and then affixing the seal to the article by heating the entire area of the seal.

2. In the application of seals with a thermoplastic adhesive to an article, the method comprising the steps of preliminarily attaching the seal to the article by heating a restricted area while the seal is in contact with the article, moving the article and seal to another position, and then applying heat to substantially the entire area of the seal to affix the seal securely to the article.

3. In the forming and application of seals with a thermoplastic adhesive to an article, the method comprising the steps of preliminarily attaching the seal to the article by heating a restricted area, heating the entire seal, and then applying pressure to the seal.

4. The method of applying seals with a thermoplastic adhesive to the ends of shot shells comprising the steps of preliminarily attaching the seal to the shot shell by heating a portion of the seal and then affixing the seal to the shot shell by heating the entire area of the seal.

5. In a machine for applying seals with a thermoplastic adhesive to an article, the combination comprising: means to feed an article to be sealed; means to feed a seal to the article; means including a heater to preliminarily affix the seal to the article; and means thereafter to permanently affix the seal to the article.

6. In a machine for applying seals with a thermoplastic adhesive to an article, the combination comprising: means to feed the articles to be sealed; means to feed the sealing material over the articles; means including a punch with a heater therein, said punch and heater cutting and preliminarily affixing a seal to an article which has been moved under the punch by the feeding means; means to move the article to another position; and heater means to apply heat to substantially the entire area of the seal.

7. In a machine for applying seals with a thermoplastic adhesive to articles, the combination comprising: means to feed the sealing material in strip form; means including a punch with a heater of restricted area therein; means to feed the articles underneath the punch, said punch cooperating with a die, whereby a seal is cut and preliminarily affixed to an article.

8. In a machine for applying seals with a thermoplastic adhesive to an article, the combination comprising: means to feed the sealing material in strip form; means including a punch with a heater of restricted area therein; means to feed the article underneath the punch, said punch cooperating with a die, whereby a seal is cut and preliminarily affixed to the article; reciprocating means to move the article to another position; and a second heater means to apply heat to substantially the entire area of the seal.

9. Means to form and apply a seal having a thermoplastic adhesive comprising a hollow punch, a die cooperating therewith, a heater within the hollow punch and spaced therefrom, said heater being so located as to contact the seal and heat a small portion thereof and to be insulated from the cutting edge of the punch.

10. Means to apply a seal having a thermoplastic adhesive comprising a hollow punch, a die cooperating therewith, a heater within the hollow punch and substantially flush with the lower end so as to contact the seal, said heater being spaced from the walls of the punch so as to be insulated therefrom.

11. In a machine for affixing seals to articles, the combination comprising: a punch; a die cooperating with said punch; means to move the sealing material over the die and over the article, said sealing material having a thermoplastic as the adhesive, said punch having a heater therein smaller than the diameter of the punch, said punch in cooperation with the die cutting the seal material and carrying it onto the article, the heater therein preliminarily attaching the seal to the article; means to move the article; a heater to engage the article after it is moved so as to complete the fixing of the seal to the article.

12. In a machine for applying seals with a thermoplastic adhesive to shot shells, the combination comprising: feeding means for the shot shells; feeding means for the seals to be applied to the ends of the shot shells; means including a heater to preliminarily affix the seal to the shot shell; and means to thereafter permanently affix the seal to the shot shell.

13. In a machine for applying seals with a thermoplastic adhesive to a shot shell, the combination comprising: means to feed the sealing material in strip form; means including a punch with a heater of restricted area therein; means to feed the shot shell to a position in line with the punch, said punch cooperating with the die whereby a seal is cut and preliminarily affixed to the shell.

14. In a machine for applying seals with a thermoplastic adhesive to a top-heavy article, the combination comprising: feeding means for the articles including means to keep the articles upright; feeding means for the seals to be applied to the ends of the articles; means including a heater to preliminarily affix the seals to the articles; and means to thereafter permanently affix the seals to the articles.

15. In a machine for applying seals with a thermoplastic adhesive to a shot shell, the combination comprising: feeding means for the shot shells including means to keep the shot shells upright; feeding means for the seals to be applied to the end of the shot shells; means including a heater to preliminarily affix the seals to the shot shells; and means to thereafter permanently affix the seals to the shot shells.

16. In a machine for applying seals with a thermoplastic adhesive to an article, the combination comprising: means to feed the article to be sealed; means to feed the sealing material over the article, a punch with a heater therein, a die cooperating with the punch; means to raise the article against the die so that operation of the punch will sever a seal and affix it to the article while said article is in raised position against the die.

17. In a machine for applying seals with a thermoplastic adhesive to an article, the combination comprising: means to feed the article to be sealed; means to feed the sealing material over the article, a punch with a heater therein, a die cooperating with the punch, means to raise the article against the die so that operation of the punch will sever a seal and preliminarily affix it to the article, which has been raised against the die; means to move the article to another position after the article has been again lowered; and a second heater means to apply heat to substantially the entire area of the seal.

18. In a machine for applying labels with a thermoplastic adhesive to an article, the combination comprising: means to feed the label material; means to apply printing thereto; means including a punch and heater of restricted area; means to feed an article underneath the said punch cooperating with the die; means to raise the article against the die, whereby upon operation of the punch a label is cut and affixed to the article while it is raised against the die, the relation of the printing means and punch being such as to bring the punch into registry with the matter printed on the label.

19. In a machine for applying seals with a thermoplastic adhesive to articles, the combination comprising: a common driving means; a seal severing means; means for feeding the sealing material in strip form underneath the seal severing means; means to feed the articles underneath the seal severing means, said seal severing means having a heater therein, the seal severing means, sealing material feeding means, and article feeding means being driven by the common operating means so that the sealing material and articles are moved under the seal severing means and remain there while the seal severing means severs a label from the stationary sealing material and affixes it to the article.

20. In a machine for applying labels with a thermoplastic adhesive to an article, the combination comprising: printing means with an individual label stamp and operating means therefor, means to feed label material in strip form under said printing means, a punch with a heater of restricted area and a die cooperating with said punch, means to feed the label material from the stamp to a position under the punch and over the die with an individual printed label in registry with said punch and die, means to feed an article underneath the punch, means to operate the punch to sever an individual label from the strip and preliminarily affix the same to the article thereunder by heating a portion of the label, means to move the article to a second position, and a second heater means to apply heat to substantially the entire area of the label in the second position.

WARREN S. REYNOLDS.